United States Patent
Sim et al.

(10) Patent No.: US 12,265,018 B2
(45) Date of Patent: Apr. 1, 2025

(54) ADHESION STRENGTH MEASUREMENT SYSTEM FOR WET ELECTRODE SPECIMEN AND ADHESION STRENGTH MEASUREMENT METHOD FOR WET ELECTRODE SPECIMEN USING THE SAME

(71) Applicant: LG ENERGY SOLUTION, LTD., Seoul (KR)

(72) Inventors: Hye Jin Sim, Daejeon (KR); Woo Ha Kim, Daejeon (KR); Sung Soo Yoon, Daejeon (KR); Je Gwon Lee, Daejeon (KR); Ji Hee Yoon, Daejeon (KR); Joo Yong Park, Daejeon (KR); Hyeon Jeong Kang, Daejeon (KR); Young Seok Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/913,144

(22) PCT Filed: Mar. 15, 2022

(86) PCT No.: PCT/KR2022/003598
§ 371 (c)(1),
(2) Date: Sep. 20, 2022

(87) PCT Pub. No.: WO2022/203265
PCT Pub. Date: Sep. 29, 2022

(65) Prior Publication Data
US 2024/0219291 A1    Jul. 4, 2024

(30) Foreign Application Priority Data
Mar. 23, 2021    (KR) .................. 10-2021-0037134

(51) Int. Cl.
*G01N 19/04*    (2006.01)
*G01N 1/36*    (2006.01)

(52) U.S. Cl.
CPC ............... *G01N 19/04* (2013.01); *G01N 1/36* (2013.01)

(58) Field of Classification Search
CPC .............................. G01N 19/04; G01N 1/36
See application file for complete search history.

(56) References Cited

U.S. PATENT DOCUMENTS

| 2008/0202254 A1 | 8/2008 | Deng et al. |
| 2017/0179519 A1 | 6/2017 | Okamoto et al. |

(Continued)

FOREIGN PATENT DOCUMENTS

| CN | 103424313 B | 5/2015 |
| CN | 110398457 A | 11/2019 |

(Continued)

OTHER PUBLICATIONS

International Search Report and Written Opinion dated Jun. 21, 2022 issued in corresponding International Patent Application No. PCT/KR2022/003598.

(Continued)

*Primary Examiner* — Jamel E Williams
(74) *Attorney, Agent, or Firm* — MORGAN, LEWIS & BOCKIUS LLP

(57) ABSTRACT

The present technology relates to an adhesion strength measurement system for a wet electrode specimen that can evaluate the adhesion strength of an electrode specimen impregnated with an electrolyte solution, and an adhesion strength measurement method for a wet electrode specimen using the same. The adhesion strength measurement system includes: a test substrate; an electrode specimen attached to the test substrate; a fixing jig configured to fix the test (Continued)

substrate so that the electrode specimen attached to the test substrate is immersed in an electrolyte solution; and an adhesion strength measurement unit configured to measure a force at which a mixture layer of the electrode specimen is peeled off by applying a tensile force to the gripped electrode specimen, the adhesion strength measurement unit including a grip part configured to grip one region of the electrode specimen.

12 Claims, 6 Drawing Sheets

(56) References Cited

U.S. PATENT DOCUMENTS

2017/0204308 A1 7/2017 Zhong et al.
2018/0210034 A1 7/2018 Lee et al.
2024/0219291 A1* 7/2024 Sim .................. G01N 19/04

FOREIGN PATENT DOCUMENTS

| | | | |
|---|---|---|---|
| CN | 111458290 A | 7/2020 | |
| JP | S60-222749 A | 11/1985 | |
| JP | S61-086633 A | 5/1986 | |
| JP | 2006-010417 A | 1/2006 | |
| JP | 5692096 B2 * | 4/2015 | ............ G01N 19/04 |
| JP | 2015-141171 A | 8/2015 | |
| JP | 5758751 B2 | 8/2015 | |
| KR | 2016-0138967 A | 12/2016 | |
| KR | 101712482 B1 * | 3/2017 | |
| KR | 2017-0042175 A | 4/2017 | |
| KR | 10-1982571 B1 | 5/2019 | |
| KR | 2019-0073685 A | 6/2019 | |
| WO | 2011096177 A1 | 8/2011 | |
| WO | WO-2015147122 A1 * | 10/2015 | ........ H01M 10/0525 |

OTHER PUBLICATIONS

Hong et al., Changes of adhesion properties for negative electrode and positive electrode under wet conditions and different states of charge, International Journal of Adhesion and Adhesives, Elsevier, vol. 108, Mar. 29, 2021.
Gaikwad and Arias, Understanding the Effects of Electrode Formulation on the Mechanical Strength of Composite Electrodes for Flexible Batteries, ACS Applied Materials & Interfaces 2017, vol. 9, No. 7,pp. 6390-6400, Feb. 2, 2017.
Extened European Search Report dated Jul. 6, 2023 issued in corresponding European Patent Application No. 22775967.7.

* cited by examiner

[FIG. 1]
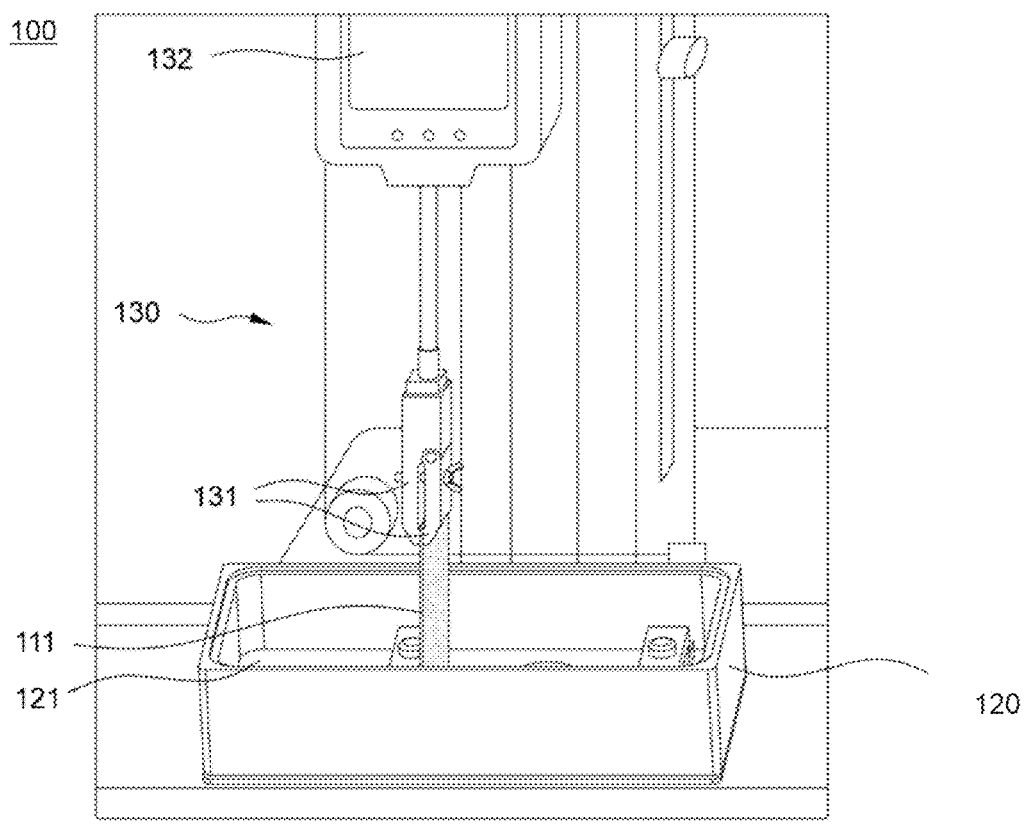

[FIG. 2]
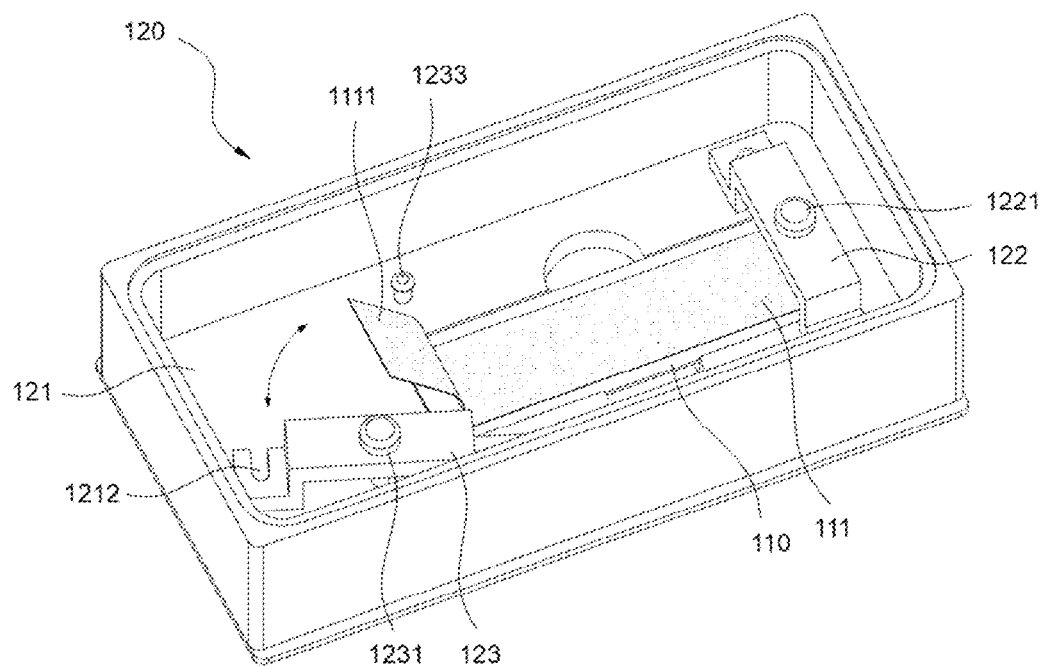

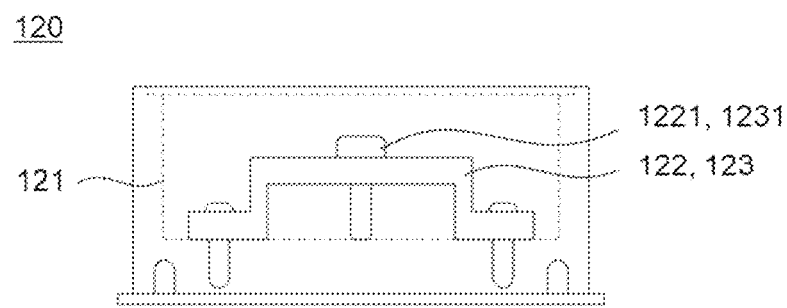

[FIG. 4]
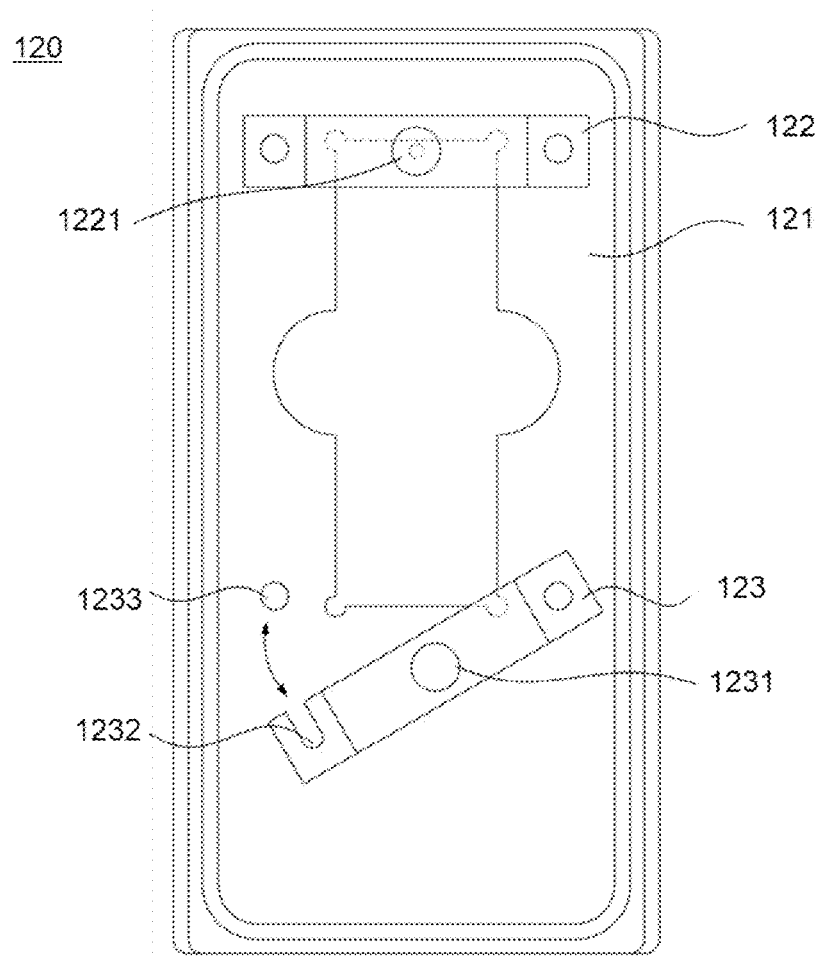

[FIG. 5]
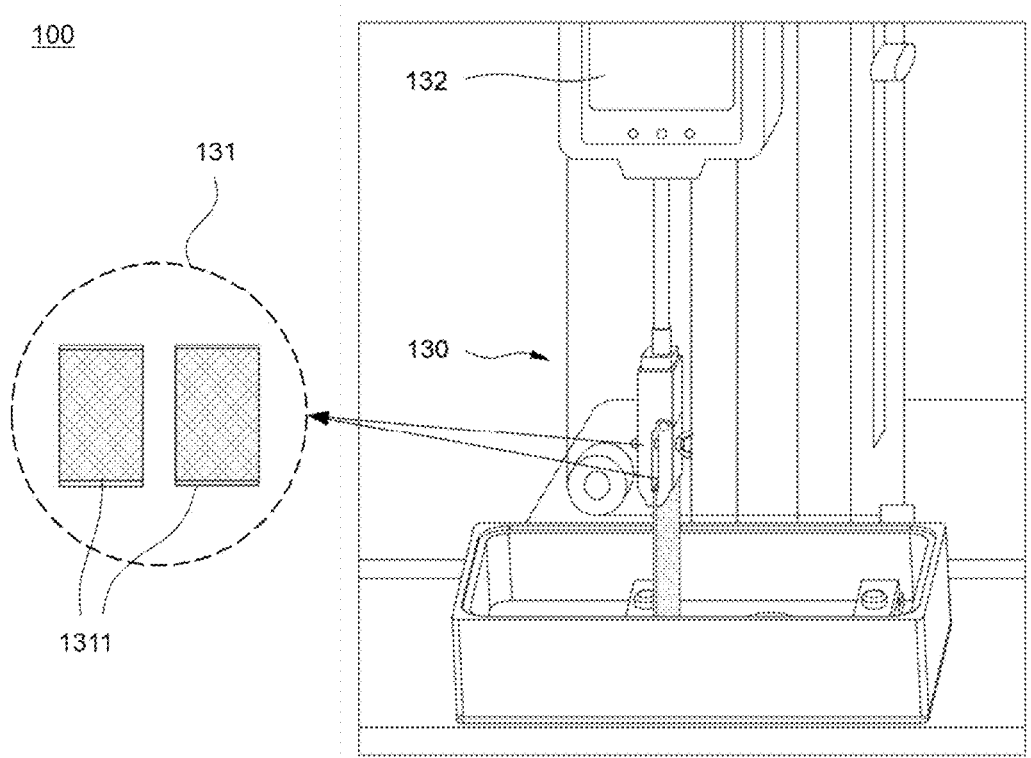

[FIG. 6]
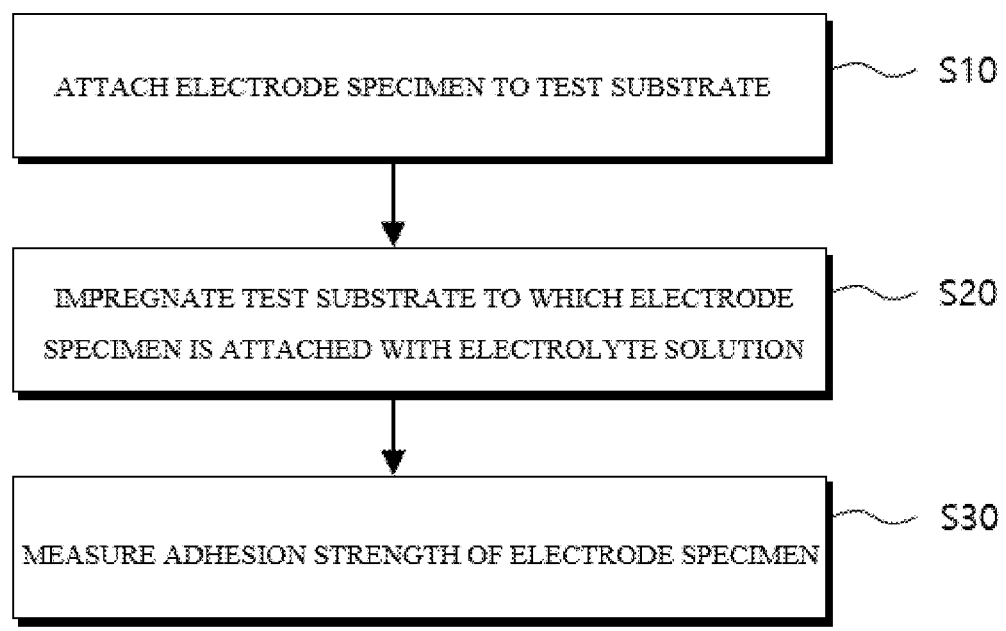

ADHESION STRENGTH MEASUREMENT SYSTEM FOR WET ELECTRODE SPECIMEN AND ADHESION STRENGTH MEASUREMENT METHOD FOR WET ELECTRODE SPECIMEN USING THE SAME

TECHNICAL FIELD

This application claims the benefit of priority based on Korean Patent Application No. 10-2021-0037134, filed on Mar. 23, 2021, and the entire contents disclosed of the Korean patent application are incorporated herein as part of this specification.

The present invention relates to an adhesion strength measurement system for wet electrode specimens and an adhesion strength measurement method for wet electrode specimens using the same.

BACKGROUND ART

With developments in technology and increases in demand for mobile devices, the demand for secondary batteries as an energy source is rapidly increasing. Among secondary batteries, lithium secondary batteries are widely used as an energy source for various electronic products as well as various mobile devices because they have high energy density and operating voltage and excellent preservation and life cycle characteristics.

Also, secondary batteries are attracting attention as an energy source for electric vehicles or hybrid electric vehicles, which have been proposed as a solution to air pollution caused by conventional gasoline and diesel vehicles which use fossil fuels and the like. In order to apply secondary batteries as an energy source for electric vehicles, the secondary batteries need to be high-output secondary batteries.

These secondary batteries are being developed as models that can realize high voltage and high capacity according to consumers' needs. In order to implement high capacity, an optimization process for a cathode material, an anode material, a separator, and an electrolyte solution, which are the four major elements of a secondary battery, is required in a limited space.

Meanwhile, an electrode to be applied to a secondary battery is prepared by applying an electrode slurry on a current collector and drying in the form of a thin metal thin film. Because a mechanical/environmental load is applied to an electrode in the electrode preparation process, it is required to sample an electrode specimen after the process of a specific step or for each part and to evaluate the physical properties of the specimen.

The adhesion strength of the electrode during the evaluation of the physical properties of the electrode is a major factor that affects the preparation processability of the secondary battery or the performance of the secondary battery. Thus, a process of measuring the adhesion strength of an electrode mixture layer (hereinafter referred to as the adhesion strength of the electrode) during the adhesive coating of the electrode current collector with the electrode slurries is required during the preparation process. Specifically, a method of measuring the adhesion strength of an electrode uses an apparatus for measuring peel strength by peeling the electrode mixture layer (active material) from the electrode current collector in order to measure the adhesion strength of the electrode mixture layer.

As described above, in a typical electrode adhesion strength measurement method, the peel strength is measured using a dried electrode.

However, an electrode in an actual secondary battery is impregnated with an electrolyte solution. Therefore, in order to more accurately evaluate the preparation processability of a secondary battery or the performance of a secondary battery, there is a need for a technology capable of simulating the actual state of an electrode inside the secondary battery and measuring the adhesion strength of the electrode.

DISCLOSURE

Technical Problem

The present invention is to solve the above problems and provides an adhesion strength measurement system for wet electrode specimens, the system being capable of evaluating the adhesion strength of an electrode specimen impregnated with an electrolyte solution, and an adhesion strength measurement method for wet electrode specimens using the same.

Technical Solution

The present invention provides an adhesion strength measurement system for wet electrode specimens. In one example, the adhesion strength measurement system for wet electrode specimens according to the present invention includes a test substrate to which an electrode specimen is attached; a fixing jig configured to fix the test substrate so that the electrode specimen attached to the test substrate is immersed in an electrolyte solution; and an adhesion strength measurement unit configured to measure a force at which a mixture layer of the electrode specimen is peeled off by applying a tensile force to the gripped electrode specimen, the adhesion strength measurement unit including a grip part configured to grip one region of the electrode specimen.

Specifically, the adhesion strength measurement system includes a test substrate to which a surface of a mixture layer of an electrode specimen is attached; a fixing jig configured to hold an electrolyte solution therein and configured to fix the test substrate such that the electrode specimen attached to the test substrate is immersed in the electrolyte solution, and an adhesion strength measurement unit configured to measure a force at which the mixture layer of the electrode specimen is peeled off by applying a tensile force to the gripped electrode specimen, the adhesion strength measurement unit including a grip part configured to grip one region of the electrode specimen. In this case, the fixing jig may have one surface in which a recessed portion of a structure recessed to hold the electrolyte solution is formed.

Furthermore, the present invention provides an adhesion strength measurement method using the above-described adhesion strength measurement system for wet electrode specimens.

In one example, the adhesion strength measurement method for wet electrode specimens according to the present invention includes operations of impregnating a test substrate to which an electrode specimen is attached with an electrolyte solution and measuring the adhesion strength of the electrode specimen by applying a tensile force to the electrode specimen impregnated with the electrolyte solution while the test substrate is fixed to a fixing jig.

Specifically, the adhesion strength measurement method includes operations of attaching an electrode specimen to a test substrate such that a mixture layer of the electrode specimen is in contact with the test substrate; impregnating the test substrate to which the electrode specimen is attached with an electrolyte solution; and measuring the adhesion strength of the electrode specimen by applying a tensile force to the electrode specimen impregnated with the electrolyte solution to measure a force at which the mixture layer of the electrode specimen is peeled off while the test substrate is fixed to a fixing jig.

Advantageous Effects

With the adhesion strength measurement system for wet electrode specimens and the adhesion strength measurement method for wet electrode specimens using the same according to the present invention, it is possible to simulate an electrode in a secondary battery, thereby facilitating the measurement of the adhesion strength of the electrode.

BRIEF DESCRIPTION OF THE DRAWINGS

FIG. 1 is a schematic diagram of an adhesion strength measurement system according to one embodiment of the present invention.

FIG. 2 is a schematic diagram of a fixing jig in the adhesion strength measurement system according to the present invention.

FIG. 3 is a side view of a fixing jig according to one embodiment of the present invention.

FIG. 4 is a plan view of a fixing jig according to one embodiment of the present invention.

FIG. 5 is a schematic diagram of an adhesion strength measurement system according to another embodiment of the present invention.

FIG. 6 is a flowchart illustrating an adhesion strength measurement method for wet electrode specimens in one example of the present invention.

BEST MODES

The present invention provides an adhesion strength measurement system for wet electrode specimens. In one example, the adhesion strength measurement system for wet electrode specimens according to the present invention includes a test substrate to which an electrode specimen is attached; a fixing jig configured to fix the test substrate so that the electrode specimen attached to the test substrate is immersed in an electrolyte solution; and an adhesion strength measurement unit configured to measure a force at which a mixture layer of the electrode specimen is peeled off by applying a tensile force to the gripped electrode specimen, the adhesion strength measurement unit including a grip part configured to grip one region of the electrode specimen.

An electrode in a secondary battery is impregnated with an electrolyte solution. The adhesion strength of an electrode may vary depending on whether the electrode is wet or dry. According to the present invention, it is possible to simulate the state of an electrode positioned in a secondary battery and then measure the adhesion strength of the electrode.

In one embodiment, the electrode specimen is attached to the test substrate such that the surface of the mixture layer of the electrode specimen is in contact with the test substrate, and the fixing jig holds an electrolyte solution therein and fixes the test substrate such that the electrode specimen attached to the test substrate is immersed in the electrolyte solution.

In a specific embodiment, the fixing jig has one surface in which a recessed portion of a structure recessed to hold the electrolyte solution is formed. The electrolyte solution is held in the recessed portion.

In one example, the fixing jig includes first and second fixing parts configured in the form of a bar to fix one side and the other side of the test substrate, respectively. Meanwhile, one side of the second fixing part may be pivotably engaged by a hinge pin, and the other side of the second fixing part may have a coupling groove formed thereon.

In a specific example, the fixing jig includes a coupling protrusion to which the coupling groove of the second fixing part is to be coupled. In addition, the coupling protrusion may be positioned in a region facing the hinge pin.

Furthermore, the first and second fixing parts may include clamping members for pressing the test substrate.

In another example, the grip part of the adhesion strength measurement unit includes a metal jaw face having a surface in which an engraved or embossed grid is formed. In a specific example, the depression depth or protrusion height of the engraved or embossed grid formed on the surface of the metal jaw face may range, on average, from 0.001 to 1 mm.

In still another example, the adhesion strength measurement unit according to the present invention further includes an output unit configured to output the force at which the mixture layer of the electrode specimen is peeled off.

Furthermore, the present invention provides an adhesion strength measurement method using the above-described adhesion strength measurement system for wet electrode specimens.

In one example, the adhesion strength measurement method for wet electrode specimens according to the present invention includes operations of impregnating a test substrate to which an electrode specimen is attached with the electrolyte solution and measuring the adhesion strength of the electrode specimen by applying a tensile force to the electrode specimen impregnated with the electrolyte solution while the test substrate is fixed to a fixing jig.

In a specific example, the operation of attaching the electrode specimen to the test substrate includes attaching the electrode specimen to the test substrate such that the mixture layer of the electrode specimen is in contact with the test substrate. Also, the operation of measuring the adhesion strength of the electrode specimen includes measuring the force at which the mixture layer of the electrode specimen is peeled off by applying a tensile force to the electrode specimen impregnated with the electrolyte solution.

Specifically, the adhesion strength measurement method for wet electrode specimens according to the present invention includes operations of attaching an electrode specimen to a test substrate such that the mixture layer of the electrode specimen is in contact with the test substrate; impregnating the test substrate to which the electrode specimen is attached with the electrolyte solution; and measuring the adhesion strength of the electrode specimen by applying a tensile force to the electrode specimen impregnated with the electrolyte solution to measure the force at which the mixture layer of the electrode specimen is peeled off while the test substrate is fixed to a fixing jig.

In one example, the operation of attaching the electrode specimen to the test substrate includes a process of attaching a double-sided adhesive tape to one surface of the test substrate; and a process of attaching the electrode specimen to the test substrate to which the double-sided adhesive tape is attached such that the surface of the mixture layer of the electrode specimen is in contact with the test substrate. In this case, the process of attaching the electrode specimen may include attaching the electrode specimen except the self-standing region of the electrode specimen to the test substrate.

In one example, the operation of impregnating the test substrate to which the electrode specimen is attached with the electrolyte solution may include a process of impregnating the electrode specimen except the self-standing region with the electrolyte solution.

In another example, the operation of measuring the adhesion strength of the electrode specimen includes a process of stretching the self-standing region of the electrode specimen in a direction perpendicular to the test substrate.

Meanwhile, the electrode specimen may have a structure with a metal current collector and an electrode mixture layer formed on one or both sides of the metal current collector.

DETAILED DESCRIPTION OF THE PREFERRED EMBODIMENTS

The present invention will be described in detail below. Prior to the description, the terms or words used in the present specification and claims should not be construed as being limited to conventional or dictionary meanings and should be interpreted with meanings and concepts consistent with the technical spirit of the present invention, based on the principle that the inventor can appropriately define the concepts of the terms in order to best describe his invention.

The present invention relates to an adhesion strength measurement system for wet electrode specimens and an adhesion strength measurement method for wet electrode specimens using the same.

Generally, the adhesion strength measurement method for an electrode includes peeling an electrode mixture layer from an electrode current collector and measuring peeling strength in order to measure the adhesion strength of the electrode mixture layer. Specifically, a double-sided tape is attached to a slide glass, and an electrode specimen is attached to one side of the slide glass such that the mixture layer of the electrode specimen to be evaluated is in contact with the slide glass surface. Also, a force at which one side of the electrode specimen was pulled and peeled from the slide glass was measured using a UTM instrument. That is, in the related art, in order to measure the adhesion strength of an electrode, the peel strength of a dried electrode was measured.

However, actually, an electrode in a secondary battery is impregnated with an electrolyte solution. Therefore, in order to more accurately evaluate the preparation processability of a secondary battery or the performance of a secondary battery, there is a need for a technology capable of simulating the actual state of an electrode inside the secondary battery and measuring the adhesion strength of the electrode.

Therefore, the present invention provides an adhesion strength measurement system for wet electrode specimens, the system being capable of evaluating the adhesion strength of an electrode specimen impregnated with an electrolyte solution, and an adhesion strength measurement for a wet electrode specimen using the same.

In the present invention, the term "electrode specimen" refers to an object to be measured using an adhesion strength measurement system for wet electrode specimens according to the present invention and may be an electrode having a metal current collector and an electrode mixture layer formed on one or both sides of the metal current collector.

For example, the electrode specimen may be a specimen obtained by punching an electrode to a predetermined width and a predetermined length.

An adhesion strength measurement system for wet electrode specimens and an adhesion strength measurement method for wet electrode specimens using the same according to the present invention will be described in detail with reference to the accompanying drawings.

FIG. 1 is a schematic diagram of an adhesion strength measurement system according to one embodiment of the present invention, FIG. 2 is a schematic diagram of a fixing jig in the adhesion strength measurement system according to the present invention, FIG. 3 is a side view of a fixing jig according to one embodiment of the present invention, and FIG. 4 is a plan view of a fixing jig according to one embodiment of the present invention.

Referring to FIGS. 1 and 2, an adhesion strength measurement system 100 for wet electrode specimens according to the present invention is configured to include a test substrate 110 to which an electrode specimen 111 is attached, a fixing jig 120 for fixing the test substrate 110, and an adhesion strength measurement unit 130 configured to measure a force at which a mixture layer of the electrode specimen 111 is peeled off by applying a tensile force to one region of the electrode specimen 111. Meanwhile, the fixing jig 120 may include a recessed portion 121 having a recessed structure to hold the electrolyte solution.

As one example, the adhesion strength measurement system 100 according to the present invention includes the test substrate 110 for fixing the electrode specimen 111. The test substrate 110, to which the electrode specimen 111 is attached to fix the electrode specimen 111, may be a metal block or a glass substrate (slide glass), for example, a glass substrate.

Meanwhile, the electrode specimen 111 may be attached to the surface of the test substrate 110 using an adhesive member. As a specific example, the mixture layer of the electrode specimen 111 may be attached to the surface of the test substrate 110 and may be attached to regions other than a self-standing region 1111 of the electrode specimen 111. Here, the "self-standing region" is a region of the electrode specimen 111 gripped by a grip part 131 of the adhesion strength measurement unit 130, which will be described below, and a space of the electrode specimen 111 that is not impregnated with the electrolyte solution. The self-standing region 1111 of the electrode specimen 111 may be gripped by the grip part 131 of the adhesion strength measurement unit 130 to receive a pulling force in a direction perpendicular to the test substrate 110.

The adhesive member may be a robust adhesive that has a strong adhesion strength and that does not deform during adhesion strength measurement so as not to affect the mixture layer of the electrode specimen 111. In addition, the present invention is for measuring an adhesion strength to the electrode specimen 111 in a wet state, and the adhesive member may be an adhesive that does not deform and swell when exposed to an electrolyte solution. The adhesive member may be an epoxy adhesive or a double-sided tape, for example, a polyimide double-sided tape.

In one example, the adhesion strength measurement system 100 according to the present invention includes the fixing jig 120 for fixing the test substrate 110. In a specific example, the fixing jig 120 holds the electrolyte solution therein and fixes the test substrate 110 so that the electrode specimen 111 attached to the test substrate 110 is immersed in the electrolyte solution. In particular, the recessed portion 121 of a recessed structure to hold the electrolyte solution is included in one surface of the fixing jig 120.

Specifically, it is preferable that a space be provided in the fixing jig 120 to accommodate the test substrate 110 to which the electrode specimen 111 to be evaluated is attached. In addition, the recessed portion 121 may be formed to a predetermined depth to hold the electrolyte solution therein so that the electrode specimen 111 can be easily impregnated with the electrolyte solution. Meanwhile, the space in which the test substrate 110 is seated may be provided inside the recessed portion 121 of the fixing jig 120.

In addition, the fixing jig 120 includes a fixing part for fixing the test substrate 110. In a specific example, the fixing jig 120 may include first and second fixing parts 122 and 123 in the form of a bar. The first fixing part 122 may fix one side of the test substrate 110, and the second fixing part 123 may fix the other side of the test substrate 110.

The first and second fixing parts 122 and 123 are in the form of a bar, and the test substrate 110 fixed to the fixing jig 120 is positioned between an upper surface of the recessed portion 121 and the fixing part 122 and between the upper surface of the recessed portion 121 and the fixing part 123. Also, the first and second fixing parts 122 and 123 may further include clamping members 1221 and 1231. The clamping members 1221 and 1231 serve to fix the test substrate 110 inserted between the recessed portion 121 of the fixing jig 120 and the first fixing part 122 and between the recessed portion 121 of the fixing jig 120 and the second fixing part 123. For example, the clamping members 1221 and 1231 may be clamping bolts. Also, the first and second fixing parts 122 and 123 may include threaded holes of a structure corresponding to threads formed on the outer circumferential surfaces of the clamping bolts, and the clamping bolts may fix the test substrate 110 while the clamping bolts are engaged with the holes of the first and second fixing parts 122 and 123.

As shown in FIG. 3, the first fixing part 122 may be fixed to the inside of the recessed portion 121 of the fixing jig 120 and may be provided on one side of the space where the test substrate 110 is seated. As described above, the first fixing part 122 may be in the form of a bar, and both ends of the first fixing part 122 in the form of a bar may be fixed to the upper surface of the fixing jig 120. Meanwhile, the first fixing part 122 may be installed in a direction crossing the direction of the length of the test substrate 110, and the central region other than both ends of the first fixing part 122 may be curved upward so that the test substrate 110 can be positioned between the first fixing part 122 and the upper surface of the fixing jig 120. Furthermore, the clamping member 1221 may be installed in the central region of the first fixing part 122, and the clamping member 1221 may fix one side of the test substrate 110.

As shown in FIG. 4, the second fixing part 123 may be disposed inside the recessed portion 121 of the fixing jig 120 and provided on the other side of the space where the test substrate 110 is seated. However, the second fixing part 123 may be in the form of a bar like the first fixing part 123, but one side of the second fixing part 123 may be pivotably engaged by a hinge pin (not shown), and the other side of the second fixing part 123 may have a coupling groove 1232 formed thereon. For reference, the coupling groove 1232 may be coupled to a coupling protrusion, which will be described below. One side of the second fixing part 123 is fixed, and the other side, which is pivotable, may easily fix the test substrate 110.

Furthermore, the fixing jig 120 may include a coupling protrusion 1233 to which a coupling groove 1212 of the second fixing part 123 is to be coupled. In a specific example, the coupling protrusion 1233 may be placed in a region opposite to the hinge pin (not shown). That is, when the coupling groove 1232 of the second fixing part 123 is coupled to the coupling protrusion 1233, the first and second fixing parts 122 and 123 may be parallel to each other.

Meanwhile, like the first fixing part, the central region excluding both ends of the second fixing part 123 may be curved upward so that the test substrate 110 can be positioned between the second fixing part 123 and the upper surface of the fixing jig 120. Also, the clamping member 1231 may be installed in the central region of the second fixing part 123.

In order to fix the test substrate 110 to which the electrode specimen 111 is attached to the fixing jig 120, the test substrate 110 is disposed in the recessed portion 121 of the fixing jig 120 first. In this case, the coupling groove 1212 on the other side of the second fixing part 123 is detached from the coupling protrusion 1233. Also, the clamping member 1221 of the first fixing part 122 is pressed to fix one side of the test substrate 110.

Subsequently, by pivoting the other side of the second fixing part 123, the coupling groove 1212 is coupled to the coupling protrusion 1233. Also, the clamping member 1231 of the second fixing part 123 is pressed to fix the other side of the test substrate 110. Meanwhile, when the electrode specimen 111 is attached to the test substrate 110, the self-standing region 1111 is excluded. The clamping member 1231 of the second fixing part 123 may fix the test substrate 110 except the self-standing region 1111 of the electrode specimen 111.

In one example, the adhesion strength measurement system 100 for wet electrode specimens according to the present invention includes an adhesion strength measurement unit 130. In a specific example, the adhesion strength measurement unit 130 may include the grip part 131 for gripping one region of the electrode specimen 111 and measure a force (hereinafter referred to as an adhesion strength) at which the mixture layer of the electrode specimen 111 is peeled off by applying a tensile force to the gripped electrode specimen 111.

The adhesion strength measurement unit 130 may be a conventional peel tester. As a specific example, the adhesion strength measurement unit 130 may fix the self-standing region 1111 of the electrode specimen 111 to the grip part 131 of the adhesion strength measurement unit 130 in order to measure the adhesion strength of the electrode specimen 111 and measure a force at which the mixture layer is peeled off at an angle of 90°.

In one example, the adhesion strength measurement unit 130 further includes an output unit 133 configured to output the force at which the mixture layer of the electrode specimen 111 is peeled off. The output unit 133 may express the adhesion strength of the electrode specimen 111 using a numerical value.

As another example, the adhesion strength measurement unit 130 may further include a storage unit (not shown). When the measurement of the adhesion strength of the electrode specimen 111 is finished, the storage unit receives and stores the adhesion strength measurement result. The storage unit may store the measurement results for the electrode specimen to build a database for the measurement results. Specifically, the type of the electrode specimen 111 is classified according to the type and thickness of the metal thin film, the type of the active material forming the mixture layer, and the like, and accordingly the adhesion strength measurement result for the electrode specimen 111 may be summarized in a table or graph. When the measurement data is variously combined, it is possible to predict the adhesion strength of the electrode specimen 111, and it is also possible to predict whether an electrode is de-inserted after a battery cell is prepared.

FIG. 5 is a schematic diagram of an adhesion strength measurement system according to another embodiment of the present invention. Referring to FIG. 5, the adhesion strength measurement unit 130 of the adhesion strength measurement system 100 may include the grip part 131 for gripping the self-standing region, which is one region of the electrode specimen 111.

In this case, the grip part 131 may include a metal jaw face 1311 having a surface where a grid is formed. A phenomenon in which the mixture layer of the electrode specimen 111 is de-inserted or the electrode specimen slips while the electrode specimen is pressed by the grip part 131 may occur in the process of measuring the physical properties of the electrode specimen 111. According to the present invention, by forming a grid on a surface of the jaw face facing the electrode specimen 111, it is possible to increase the fixing force of the grip part 131 to the electrode specimen 111. The metal jaw face 1311 may be formed of various types of metals, for example, carbon steel, stainless steel, aluminum, or an alloy thereof.

In one example, the metal jaw face 1311 mentioned in the present invention has a surface on which an engraved or embossed grid is formed. By forming the grid pattern on the surface of the metal jaw face 1311, it is possible to increase the fixing force to the electrode specimen 111. In the present invention, the term "grid" refers to a pattern in the form of a lattice or a checkerboard grid and collectively refers to forms in which two or more parallel patterns intersect each other. In a specific example, the depression depth or protrusion height of the engraved or embossed grid formed on the surface of the metal jaw face 1311 ranges, on average, from 0.001 to 1 mm. For example, the depression depth or protrusion height of the grid ranges, on average, from 0.001 to 0.1 mm, from 0.001 to 0.01 mm, from 0.01 to 0.1 mm, or from 0.01 to 0.05 mm. According to the present invention, by forming a pattern with a very low level of depression or protrusion, it is possible to increase the fixing force to the electrode specimen 111 without degrading the mechanical properties of the electrode specimen 111.

In addition, the present invention provides an adhesion strength measurement method for wet electrode specimens using the above-described adhesion strength measurement system for wet electrode specimens.

FIG. 6 is a flowchart illustrating an adhesion strength measurement method for wet electrode specimens in one example of the present invention. Referring to FIG. 6, the adhesion strength measurement method for wet electrode specimens according to the present invention includes operations of attaching an electrode specimen to a test substrate such that a mixture layer of the electrode specimen is in contact with the test substrate (S10); impregnating the test substrate to which the electrode specimen is attached with an electrolyte solution (S20); and measuring the adhesion strength of the electrode specimen by applying a tensile force to the electrode specimen impregnated with the electrolyte solution to measure a force at which the mixture layer of the electrode specimen is peeled off while the test substrate is fixed to a fixing jig (S30).

First, the operation of attaching the electrode specimen to the test substrate (S10) includes a process of attaching a double-sided adhesive tape to one surface of the test substrate; and a process of attaching the electrode specimen to the test substrate to which the double-sided adhesive tape is attached such that the surface of the mixture layer of the electrode specimen is in contact with the test substrate. In this case, the process of attaching the electrode specimen may include attaching the electrode specimen except the self-standing region of the electrode specimen to the test substrate. The self-standing region, which is one region of the electrode specimen, may be gripped by the grip part of the adhesion strength measurement unit and may be a region of the electrode specimen which is not impregnated with an electrolyte solution.

As a specific example, the operation of attaching the electrode specimen to the test substrate (S10) includes attaching the electrode specimen to be evaluated to a glass substrate, which is the test substrate, using a double-sided adhesive tape. In this case, the surface of the mixture layer of the electrode specimen may be in contact with the glass substrate. In addition, after attaching the electrode specimen to the glass substrate, it may be rolled with a roller about 10 times. Also, after the test substrate to which the electrode specimen is attached is left in a temperature range of 40° C. to 80° C., a temperature range of 50° C. to 70° C., or a temperature of about 60° C. for 6 to 16 hours, 10 to 14 hours, or about 12 hours, the degree of transfer of the electrode specimen can be confirmed.

Next, the present invention includes the operation of impregnating the test substrate to which the electrode specimen is attached with the electrolyte solution (S20). In this case, the operation of impregnating the test substrate to which the electrode specimen is attached with the electrolyte solution (S20) may include a process of impregnating the electrode specimen except the self-standing region with the electrolyte solution. The self-standing region is a region gripped by the grip part of the adhesion strength measurement unit and is a region that is not affected by the electrolyte solution during the adhesion strength measurement test. In a specific example, the operation of impregnating the test substrate to which the electrode specimen is attached with the electrolyte solution (S20) may include confirming that the electrode specimen is attached to the test substrate, placing the test substrate on a tray, injecting the electrolyte solution, closing the lid of the tray, and then performing impregnation.

Also, the present invention includes the operation of measuring an adhesion strength using the electrode specimen impregnated with the electrolyte solution (S30). The operation of measuring the adhesion strength of the electrode specimen (S30) includes a process of fixing the test substrate to which the electrode specimen is attached to the fixing jig and transferring the electrolyte solution in the tray according to the present invention. Also, by applying a tensile force to the electrode specimen impregnated with the electrolyte while the test substrate is fixed to the fixing jig, a force at which the mixture layer of the electrode specimen is peeled off may be measured.

In a specific example, the operation of measuring the adhesion strength of the electrode specimen (S30) includes a process of stretching the self-standing region of the electrode specimen in a direction perpendicular to the test substrate. That is, the operation of measuring the adhesion strength of the electrode specimen (S30) may include performing measurement using a 900 peel test. For example, the adhesion strength of the electrode specimen may be measured by setting the load of the UTM instrument to zero and then setting the load speed in the range of 10 to 200 mm/min. For example, the adhesion strength of the electrode specimen may be measured using the UTM instrument (TA corporation).

The operation of measuring the adhesion strength of the electrode specimen (S30) includes measuring the adhesion strength of a wet electrode specimen. In this case, the adhesion strength of the electrode can be easily measured while the electrode of the internal state of the secondary battery is simulated.

Meanwhile, the electrode specimen may have a structure having a metal current collector; and an electrode mixture layer formed on one surface or both surfaces of the metal current collector, and the electrode specimen may also have a structure in which a mixture layer including an active material is formed on a positive current collector or a negative current collector.

Furthermore, the electrolyte solution may include an organic solvent and an electrolyte salt, and the electrolyte salt is a lithium salt. Those commonly used in a non-aqueous electrolyte solution for a lithium secondary battery may be used as the lithium salt without limitations. For example, the negative ions of the lithium salt may include one or a mixture of two or more selected from the group consisting of F—, Cl—, Br—, I—, $NO_3$—, $N(CN)_2$—, $BF_4$—, $ClO_4$—, $PF_6$—, $(CF_3)_2PF_4$—, $(CF_3)_3PF_3$—, $(CF_3)_4PF_2$—, $(CF_3)_5PF$—, $(CF_3)_6P$—, $CF_3SO_3$—, $CF_3CF_2SO_3$—, $(CF_3SO_2)_2N$—, $(FSO_2)_2N$—, $CF_3CF_2(CF_3)_2CO$—, $(CF_3SO_2)_2CH$—, $(SF_5)_3C$—, $CF_3(CF_2)_7SO_3$—, $CF_3CO_2$—, $CH_3CO_2$—, SCN—, and $(CF_3CF_2SO_2)_2N$—.

Organic solvents commonly used in electrolyte solution of lithium secondary batteries may be used without limitation as an organic solvent contained in the above-described electrolyte solution. For example, ethers, esters, amides, linear carbonates, or cyclic carbonates may be used individually or in a mixture of two or more types. Typically, the organic solvent may include a cyclic carbonate, a linear carbonate, or a mixture thereof, which is a carbonate compound.

Specific examples of the cyclic carbonate compound include one or a mixture of two or more selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof.

Examples of these halides include, but are not limited to, fluoroethylene carbonate (FEC).

Also, one or a mixture of two or more selected from the group consisting of dimethyl carbonate (DMC), diethyl carbonate (DEC), dipropyl carbonate, ethylmethyl carbonate (EMC), methylpropyl carbonate, and ethylpropyl carbonate may be typically used as specific examples of the linear carbonate compound, but the present invention is not limited thereto.

In particular, among the carbonate-based organic solvents, ethylene carbonate and propylene carbonate, which are cyclic carbonates, are high viscosity organic solvents and have high dielectric constants, and thus the carbonates can better dissociate lithium salts in an electrolyte. When the cyclic carbonate and a low-viscosity and low-dielectric-constant linear carbonate such as dimethyl carbonate or diethyl carbonate are mixed in an appropriate ratio, it is possible to make an electrolyte solution with a higher electrical conductivity.

Also, one or a mixture of two or more selected from the group consisting of dimethyl ether, diethyl ether, dipropyl ether, methylethyl ether, methylpropyl ether, and ethylpropyl ether may be used as the ether of the organic solvent, but the present invention is not limited thereto.

Also, one or a mixture of two or more selected from the group consisting of methyl acetate, ethyl acetate, propyl acetate, methyl propionate, ethyl propionate, propyl propionate, γ-butyrolactone, γ-valerolactone, γ-caprolactone, α-valerolactone, and ε-caprolactone may be used as the ester of the organic solvent, but the present invention is not limited thereto.

Hereinafter, the present invention will be described in detail with reference to embodiments, etc. However, the configurations described in the embodiments described herein are only examples of the present invention and do not represent all the technical spirit of the present invention, so it should be understood that various equivalents and modifications may be substituted for the configurations at the time of filing the present application.

PREPARATION EXAMPLES

Preparation Example 1

Using a slot die, one surface of a copper (Cu) thin film, which is a negative current collector, was coated with negative electrode slurries having a solid content of 48% to form a mixture layer on the surface of the copper thin film. Then, the mixture layer was rolled by a roll pressing method to prepare an electrode in which the mixture layer was formed. At this time, when the coating was performed with the negative electrode slurries, the coating speed was 32 m/min, and the rolling pressure was 1.05 tons/cm$^2$. Then, the electrode was punched to a size of 20 mm×125 mm to prepare an electrode specimen.

Preparation Examples 2 to 6

An electrode specimen was prepared in the same manner as in Preparation Example 1, except that the coating speed of the negative electrode slurries, the solid content, and the pressure during the rolling process were changed.

In each preparation example, the coating speed of the negative electrode slurries, the solid content, and the rolling pressure of the mixture layer during the preparation of the electrode were as shown in Table 1 below.

TABLE 1

| No. | Coating speed (m/min) | Solid content (%) | Rolling nip pressure (tons/cm$^2$) |
|---|---|---|---|
| Preparation Example 1 | 32 | 48 | 1.05 |
| Preparation Example 2 | 50 | 48 | 1.02 |
| Preparation Example 3 | 50 | 48 | 1.00 |
| Preparation Example 4 | 50 | 48 | 0.86 |
| Preparation Example 5 | 50 | 48 | 1.05 |
| Preparation Example 6 | 50 | 49 | 0.99 |

EXPERIMENTAL EXAMPLE

Experimental Example 1. Measurement of Adhesion Strength of Dry Electrode

The adhesion strength to an electrode specimen prepared in each Preparation Example was measured by a 90° peel test.

Specifically, an imide double-sided tape was attached to the slide glass, and the electrode prepared in each Preparation Example was placed and adhered thereto by rolling a roller with a load of 2 kg ten times. Meanwhile, the electrode specimen was attached to one surface of the slide glass so that the mixture layer of the electrode specimen was in contact with the surface of the slide glass.

Then, the slide glass to which the electrode specimen was attached was left in an oven at 60° C. for about 12 hours, and the degree of adhesion strength of the electrode specimen to the double-sided tape was checked using a torn portion of the electrode specimen.

Next, a force at which one side of the electrode specimen was pulled at 100 mm/min and peeled off from the slide glass was measured using the UTM instrument (TA corporation). At this time, the measurement angle between the slide glass and the electrode was 90°.

At this time, three electrode specimens were prepared, the adhesion strength of each electrode specimen was measured through the above-described 90° peel test, and the average value was found. The results are shown in Table 2 below.

Experimental Example 2. Measurement of Adhesion Strength of Electrode Impregnated with Electrolyte Solution After the electrode specimen prepared in each Preparation Example was impregnated with an electrolyte solution, the adhesion strength of the electrode specimen was measured using the 90° peel test.

Specifically, an imide double-sided tape was attached to the slide glass, and the electrode prepared in each Preparation Example was placed and adhered thereto by rolling a roller with a load of 2 kg ten times. In this case, the electrode specimen except the self-standing region of the electrode specimen was attached to the slide glass so that the mixture layer of the electrode specimen was in contact with the surface of the slide glass.

Then, the slide glass to which the electrode specimen was attached was left in an oven at 60° C. for about 12 hours, and the degree of adhesion strength of the electrode specimen to the double-sided tape was checked using a torn portion of the electrode specimen.

Next, the slide glass to which the electrode specimen was attached was placed on a tray, and an electrolyte solution in which 1 M $LiPF_6$ was dissolved in a mixed solvent (DEC:EC=1:1) of dimethyl carbonate (DEC) and ethylene carbonate (EC) was placed so that the electrode specimen was impregnated with the electrolyte solution. In this case, the self-standing region of the electrode specimen was not impregnated with the electrolyte solution. Also, the electrolyte solution and the electrode specimen were transferred to an adhesion strength measurement jig of the present invention, and the adhesion strength of the electrode specimen was measured in the same manner as in Experimental Example 1. At this time, three electrode specimens were prepared, the adhesion strength of each electrode specimen was measured through the above-described 90° peel test, and the average value was found. The results are shown in Table 2 below.

Experimental Example 3. Checking of Electrode De-Insertion after Preparation of Electrode Cell After a monocell was prepared using a negative electrode according to each preparation example, it was checked whether a negative-electrode active material fell out.

In the monocell, lithium metal was used as a positive electrode, and a separator was interposed between the negative electrode and the positive electrode. Then, the monocells were stacked to prepare an electrode assembly. Subsequently, an electrolyte solution in which 1 M $LiPF_6$ was dissolved in a mixed solvent (DEC:EC=1:1) of dimethyl carbonate (DEC) and ethylene carbonate (EC) was injected into the electrode assembly to prepare a lithium secondary battery.

The lithium secondary battery prepared as described above was charged and discharged 50 times at 25° C., and the cross-section of the negative electrode was observed after disassembly. Also, the results of whether the active material was de-inserted are shown in Table 2 below.

TABLE 2

| No. | Coating speed (m/min) | Solid content (%) | Rolling nip pressure (tons/cm²) | Adhesion strength (gf/20 mm) | Wet adhesion strength (gf/10 mm) | Results of electrode de-insertion after cell preparation |
|---|---|---|---|---|---|---|
| Preparation Example 1 | 32 | 48 | 1.05 | 29.8 | 11.9 | Normal |
| Preparation Example 2 | 50 | 48 | 1.02 | 21.8 (▼27%) | 8.8 (▼26%) | Electrode de-insertion |
| Preparation Example 3 | 50 | 48 | 1.00 | 21.4 (▼28%) | 9.5 (▼21%) | Normal |
| Preparation Example 4 | 50 | 48 | 0.86 | 18.5 (▼38%) | 8.0 (▼33%) | Electrode de-insertion |
| Preparation Example 5 | 50 | 48 | 1.05 | 23.4 (▼27%) | 9.4 (▼21%) | Normal |
| Preparation Example 6 | 50 | 49 | 0.99 | 21.7 (▼27%) | 7.1 (▼41%) | Electrode de-insertion |

Referring to Table 2, after the battery cell was prepared, the de-insertion of the electrode active material did not occur in Preparation Example 1, and the de-insertion of the electrode active material occurred in Preparation Example 2.

In addition, it was possible to check the difference in adhesion strength between the dry electrode and the electrode impregnated with the electrolyte solution. In particular, comparing Preparation Example 3 and Preparation Example 6, the adhesion strengths of the dry electrodes were 21.4 gf/20 mm and 21.7 gf/20 mm, which were similar, but the adhesion strengths of the electrodes impregnated with the electrolyte solution (wet adhesion strength) were different. Specifically, the adhesion strength in Preparation Example 3 was 9.5 gf/10 mm, and the adhesion strength of Preparation Example 6 was 7.1 gf/10 mm. The wet adhesion strength was higher in Preparation Example 3 than in Preparation Example 6.

Furthermore, in the results of whether an active material was de-inserted in Preparation Example 3 and Preparation Example 6, the active material was de-inserted in the electrode of Preparation Example 6 in which the wet adhesion strength was low.

Also, referring to Table 2, it can be seen that it is difficult to estimate the adhesion strength of a wet electrode specimen only by measuring the adhesion strength of a dry electrode specimen. That is, under equivalent conditions, the dry adhesion strength may show a completely different behavior from the wet adhesion strength. In the present invention, by evaluating the adhesion strength of an electrode specimen impregnated with an electrolyte solution, it is possible to simulate an electrode in a secondary battery. Also, through the evaluation, the present invention can increase the reliability of the de-insertion prediction evaluation for the electrode active material.

The above description is merely illustrative of the technical spirit of the present invention, and those of ordinary skill in the art can make various modifications and changes without departing from the essential characteristics of the present invention. Accordingly, the embodiments disclosed in the present invention are not intended to limit but rather to describe the technical spirit of the present invention, and the technical scope of the present invention is not limited by these embodiments. The scope of the invention should be construed by the appended claims, and all technical spirits within the scopes of their equivalents should be construed as being included in the scope of the invention.

DESCRIPTION OF REFERENCE NUMERALS

100: Adhesion strength measurement system
110: Test substrate
111: Electrode
1111: Self-standing Region
120: Fixing jig
121: Recessed portion
122: First fixing part
1221: Clamping member
123: Second fixing part
1231: Clamping member
1232: Coupling groove
1233: Coupling protrusion
130: Adhesion strength measurement unit
131: Grip part
1311: Metal jaw face

The invention claimed is:

1. An adhesion strength measurement system for a wet electrode specimen, the adhesion strength measurement system comprising:
  a test substrate;
  an electrode specimen including a self-standing region and a region other than the self-standing region, the region other than the self-standing region having a metal current collector and an electrode mixture layer on at least one side of the metal current collector, and a surface of the electrode mixture layer being attached to the test substrate;
  a fixing jig having a surface defining a recessed portion to hold an electrolyte solution in the recessed portion, the fixing jig being configured to fix the test substrate so that the region other than the self-standing portion of the electrode specimen attached to the test substrate is immersed in the electrolyte solution while the self-standing portion of the electrode specimen is not impregnated with the electrolyte solution; and
  an adhesion strength measurement unit comprising a grip portion configured to grip the self-standing region of the electrode specimen and to apply a tensile force to the self-standing region in a direction perpendicular to the surface of the electrode mixture layer attached to the test substrate,
  wherein the adhesion strength measurement unit is configured to measure an applied force at which the electrode mixture layer of the electrode specimen is peeled off of the test substrate by the tensile force.

2. The adhesion strength measurement system of claim 1, wherein the fixing jig includes first and second fixing parts configured in the form of a bar to fix one side and the other side of the test substrate, respectively, and
  wherein one side of the second fixing part is pivotably engaged by a hinge pin, and a coupling groove is on the other side of the second fixing part.

3. The adhesion strength measurement system of claim 2, wherein the fixing jig comprises a coupling protrusion to which the coupling groove of the second fixing part is to be coupled, and wherein the coupling protrusion is positioned in a region facing the hinge pin.

4. The adhesion strength measurement system of claim 2, wherein each of the first and second fixing parts comprises a clamping member for pressing the test substrate.

5. The adhesion strength measurement system of claim 1, wherein the grip part of the adhesion strength measurement unit comprises a metal jaw face having a surface on which an engraved or embossed grid is formed.

6. The adhesion strength measurement system of claim 5, wherein a depression depth or protrusion height of the engraved or embossed grid on the surface of the metal jaw face ranges, on average, from 0.001 to 1 mm.

7. The adhesion strength measurement system of claim 1, wherein the adhesion strength measurement unit further comprises an output unit configured to output the force at which the mixture layer of the electrode specimen is peeled off.

8. An adhesion strength measurement method for a wet electrode specimen, the adhesion strength measurement method comprising:
  attaching an electrode specimen to a test substrate, wherein the electrode specimen includes a self-standing region and a region other than the self-standing region, the region other than the self-standing region having a metal current collector and an electrode mixture layer on at least one side of the metal current collector, and wherein a surface of the electrode mixture layer is attached to the test substrate;
  fixing the text substrate having the electrode specimen attached to a fixing jig;
  impregnating the test substrate to which the electrode specimen is attached with an electrolyte solution, wherein the test substrate and the region other than the self-standing portion of the electrode specimen are immersed in the electrolyte solution while the self-standing portion of the electrode specimen is not impregnated with the electrolyte solution; and
  measuring the adhesion strength of the electrode specimen by applying a tensile force to the self-standing region of the electrode specimen while the test substrate is immersed in the electrolyte solution and fixed to the fixing jig, wherein the tensile force is applied in a direction perpendicular to the surface of the test substrate to determine an applied force at which the electrode mixture layer of the electrode specimen is peeled off of the test substrate.

9. The adhesion strength measurement method of claim 8, wherein the attaching the electrode specimen to the test substrate comprises:
   attaching a double-sided adhesive tape to one side of the test substrate; and
   attaching the electrode specimen to the test substrate such that the test substrate to which the double-sided adhesive tape is attached is in contact with the surface of the mixture layer of the electrode specimen, and
   wherein the attaching the electrode specimen to the test substrate comprises attaching the electrode specimen except a self-standing region of the electrode specimen to the test substrate.

10. The adhesion strength measurement method of claim 9, wherein the impregnating the test substrate to which the electrode specimen is attached with the electrolyte solution comprises impregnating the electrode specimen except the self-standing region with the electrolyte solution.

11. The adhesion strength measurement method of claim 9, wherein the measuring the adhesion strength of the electrode specimen comprises a stretching the self-standing region of the electrode specimen in a direction perpendicular to the test substrate.

12. The adhesion strength measurement method of claim 8, wherein the electrode specimen has a metal current collector and an electrode mixture layer on one or both sides of the metal current collector.

\* \* \* \* \*